United States Patent
Streuer et al.

(10) Patent No.: US 8,859,135 B2
(45) Date of Patent: Oct. 14, 2014

(54) BATTERY CELL CONNECTING ELEMENT AND METHOD OF PRODUCTION THEREOF

(75) Inventors: Peter Streuer, Hannover (DE); Ingo Koch, Hameln (DE); Dirk Oldenburg, Ronnenburg (DE)

(73) Assignee: Johnson Controls Autobatterie GmbH & Co. KGaA (DE)

( * ) Notice: Subject to any disclaimer, the term of this patent is extended or adjusted under 35 U.S.C. 154(b) by 937 days.

(21) Appl. No.: 12/599,332

(22) PCT Filed: May 6, 2008

(86) PCT No.: PCT/DE2008/000771
§ 371 (c)(1),
(2), (4) Date: Mar. 25, 2010

(87) PCT Pub. No.: WO2008/138307
PCT Pub. Date: Nov. 20, 2008

(65) Prior Publication Data
US 2010/0190045 A1    Jul. 29, 2010

(30) Foreign Application Priority Data

May 9, 2007   (DE) .......................... 10 2007 022 246

(51) Int. Cl.
| | |
|---|---|
| H01M 2/24 | (2006.01) |
| H01M 2/26 | (2006.01) |
| H01M 2/28 | (2006.01) |
| H01M 10/06 | (2006.01) |
| H01M 10/12 | (2006.01) |
| H01M 2/20 | (2006.01) |

(52) U.S. Cl.
CPC .............. *H01M 2/206* (2013.01); *Y02E 60/126* (2013.01); *H01M 10/12* (2013.01)
USPC ........... 429/161; 429/149; 429/152; 429/153; 429/154

(58) Field of Classification Search
USPC ......... 429/122, 149, 152, 153, 154, 160, 161; 29/623.1
See application file for complete search history.

(56) References Cited

U.S. PATENT DOCUMENTS

| | | | |
|---|---|---|---|
| 3,944,436 A | * | 3/1976 | Gaide ........................... 429/159 |
| 4,066,418 A | | 1/1978 | Adderley |
| 5,244,756 A | * | 9/1993 | Mix et al. ...................... 429/160 |
| 2010/0003593 A1 | * | 1/2010 | Oldenburg et al. ........... 429/161 |

FOREIGN PATENT DOCUMENTS

| | | |
|---|---|---|
| DE | 6943056 | 11/1969 |
| DE | 2447639 | 4/1976 |
| DE | 10323529 | 8/2004 |
| DE | 102006053172 B3 * | 4/2008 |
| EP | 57105960 | 7/1982 |

(Continued)

*Primary Examiner* — Sean P Cullen
(74) *Attorney, Agent, or Firm* — Boardman & Clark LLP

(57) ABSTRACT

The invention relates to a battery, particularly a lead storage battery, having at least one battery cell connector element (20) comprising a substantially prismatic base body (22) extending along a longitudinal axis (L) for connection to a plurality of pole flanges on a lower face (26) of the base body (22) and a contact lug (24) disposed adjacent to a contact-lug-side end face (30) of the base body (22) on the side of the contact lug, said contact lug being connected to the base body as one piece. A second groove (46) formed in the base body (22) and running to the lower face (26) is provided according to the invention.

13 Claims, 4 Drawing Sheets

(56) References Cited

FOREIGN PATENT DOCUMENTS

Figure 1:
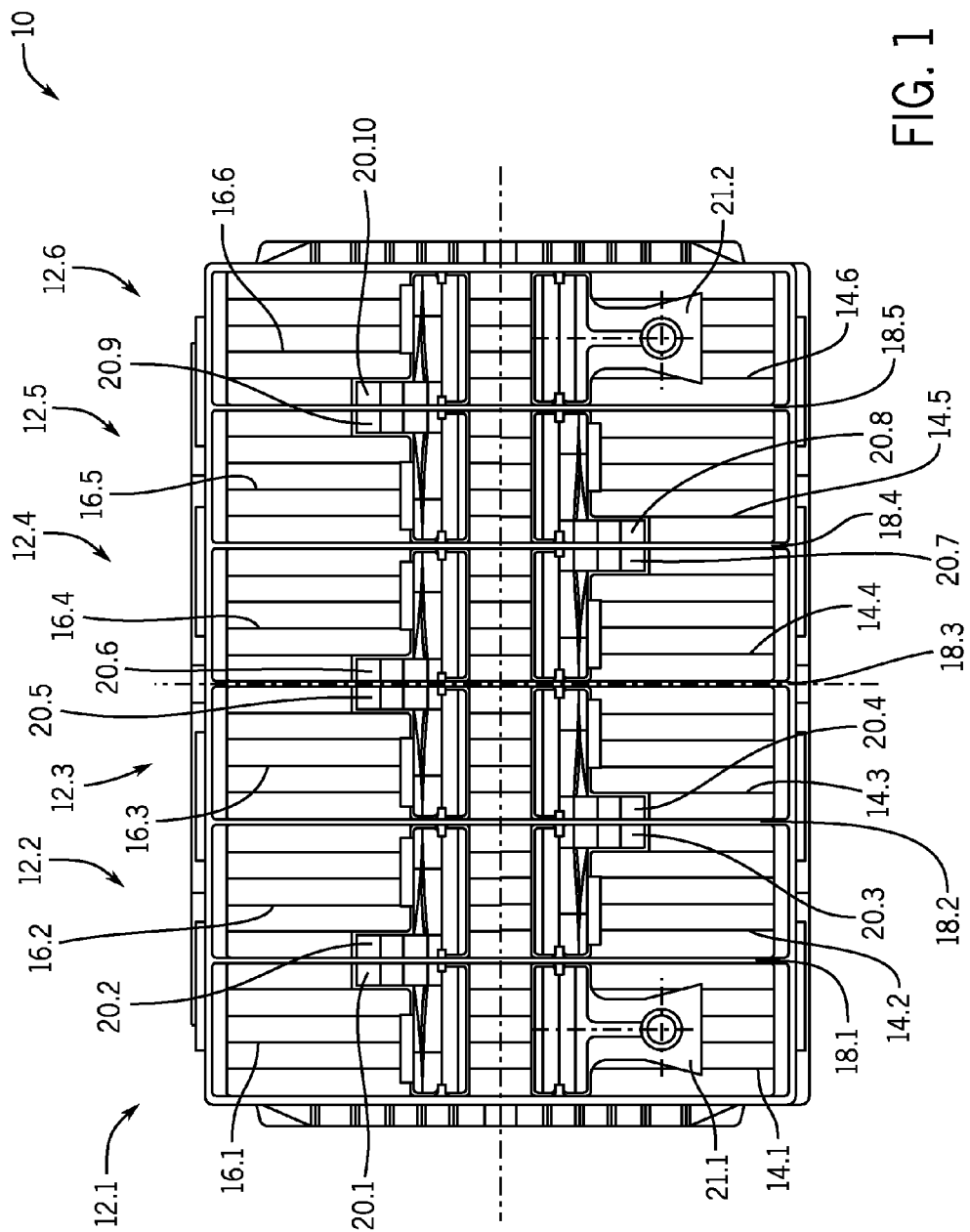

| | | |
|---|---|---|
| EP | 0547661 | 12/1992 |
| GB | 1252926 | 11/1968 |
| JP | 57-105960 | 7/1982 |
| JP | 04137356 A * | 5/1992 |

* cited by examiner

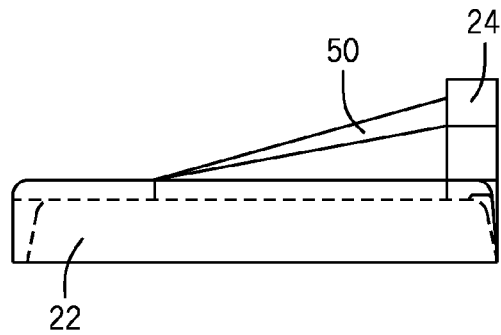
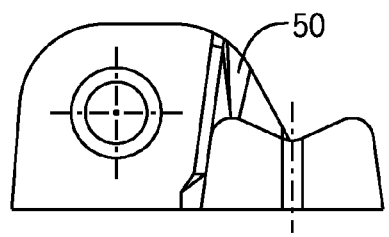
FIG. 4　　　　　FIG. 5
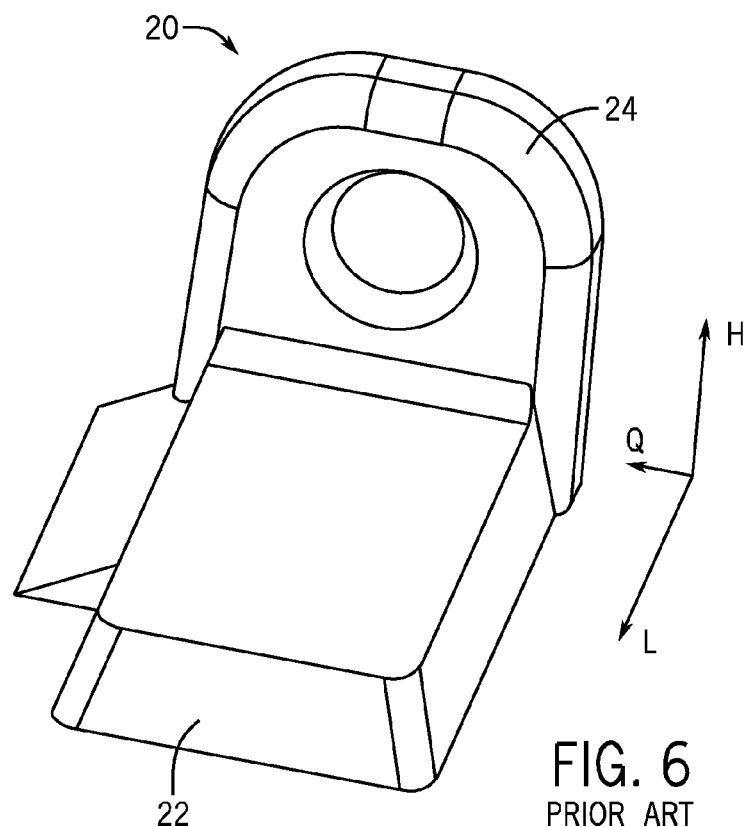
FIG. 6
PRIOR ART

BATTERY CELL CONNECTING ELEMENT AND METHOD OF PRODUCTION THEREOF

The invention relates to a battery having a battery cell connecting element, which has an essentially prismatic base body, which extends along a longitudinal axis, for connection to a plurality of pole plates on a lower face of the base body, and a contact lug, which is arranged adjacent to a contact-lug-side end face of the base body and is integrally connected to it.

By way of example, batteries such as these in the form of lead-acid rechargeable batteries are used as starter batteries in an automobile. A lead-acid rechargeable battery such as this comprises a plurality of electrochemical cells which are connected in series and are isolated from one another by an electrically insulating partition wall. Each of the electrochemical cells has a positive and negative plate set, the two of which are each formed from a plurality of pole plates. The battery cell connecting element electrically and mechanically connects the pole plates of a plate set to one another and is additionally used to make electrical contact between the plate set of one electrochemical cell and another plate set in an electrochemical cell, via a further battery cell connecting element and through the partition wall.

During the manufacture of lead-acid rechargeable batteries such as these, the pole plates are generally connected to the battery cell connecting element by means of a lug casting process. The pole plates that have been connected in this way are then installed in the lead-acid rechargeable battery.

In known lead-acid rechargeable batteries, there is a risk of pole plates becoming detached from the battery cell connecting element. This leads to undesirable scrap during production. Vibration occurring during operation of the lead-acid rechargeable battery can result in pole plates which have been poorly connected to the battery cell connecting element in some cases becoming loose, and therefore leading to an increased internal resistance in the lead-acid rechargeable battery.

The invention is based on the object of overcoming the disadvantages of the prior-art. The invention solves the problem by a battery of this generic type in which the battery cell connecting element has a groove which is arranged as a preventing element, and which is formed in the base body and runs into the lower surface.

According to a second aspect, the invention solves the problem by a method for production of a battery cell connecting element for a battery, in particular a lead-acid rechargeable battery, having the following steps: (a) provision of a plurality of pole plates and (b) casting of the pole plates with the battery cell connecting element, such that the battery cell connecting element produced has (i) an essentially prismatic base body, Which extends along a longitudinal axis, for connection to the plurality of pole plates on a lower face of the base body, (ii) a contact lug, which is arranged adjacent to a contact-lug-side end face of the base body and is integrally connected to it, and (iii) a groove which is arranged as a preventing element, and which is formed in the base body and runs into the lower face.

This has the advantage that it prevents pole plates that are arranged adjacent to the contact lug from being knocked out. This is because a projection, which forms the groove, projects into the casting space in the casting mold by means of which the battery cell connecting element is cast, during the casting of the battery cell connecting element in the course of the battery production process, preventing the possibility of the cast lugs on pole plates being arranged too close to an edge of the battery cell connecting element.

A further advantage is that the invention can be implemented using simple means. For example, only the casting mold need be modified in order to largely eliminate the risk of pole plates being knocked out.

Furthermore, advantageously, less material is required for the battery cell connecting element, for example lead, in order to produce a battery cell connecting element according to the invention without changing the electrical internal resistance of the battery according to the invention.

For the purposes of the present description, the feature that the base body is essentially prismatic means that it is not necessary for the base body to be prismatic in the strict mathematical sense. For example, it is thus possible for the base body to taper slightly conically in the longitudinal direction as the distance from the contact lug increases.

In one preferred embodiment, the groove runs essentially at right angles to the lower surface of the base body. This makes it easier to cast the battery cell connecting element. It is possible, but not necessary, for the groove to be prismatic, that is to say for the cross-sectional shape and the cross-sectional area not to change over the longitudinal extent of the groove. For example, it is thus possible for the groove to taper conically as the distance from the lower surface increases, thus making it easier to remove the battery cell connecting element from the mold. The feature that the groove runs essentially at right angles to the lower surface means that it is possible, but not necessary, for the groove to run at right angles to the lower surface in the strict mathematical sense. For example, discrepancies of less than 15°, in particular, can be tolerated when the groove tapers conically, and removal from the mold remains possible.

For example, it is possible for the groove to be inclined on a plane which runs at right angles to the lower surface of the base body and in its longitudinal direction, toward a center of the base body, through an angle of between 10° and 20°, in particular through 15°. A groove such as this improves the guidance and the introduction of an adjacent cast lug at the edge, and furthermore makes it easier to remove the battery cell connecting element from the mold.

The groove preferably runs essentially centrally with respect to a width of the base body into the lower surface. In other words, the groove runs into the lower surface at a point through which a longitudinal center line of the lower surface passes. In this way, the contact-lug-side pole plate at the edge is fastened particularly reliably to the battery cell connecting element.

According to one preferred embodiment, the groove is formed over the entire height in the contact lug. In other words, the groove extends over the entire height of the contact-lug-side end face of the battery cell connecting element. However, alternatively, it is possible for the groove to run over only a part of the height of the contact-lug-side end face.

The base body preferably has a concave upper face, opposite the lower face, which comprises a groove which extends in the longitudinal direction and runs into the groove in the contact-lug-side end face. Particularly preferably, the base body runs essentially at right angles to the contact lug, with the base body being subdivided into a contact-lug-side longitudinal section and a contact-lug-averted longitudinal section, and with the contact-lug-side longitudinal section running into the contact lug in a shoulder. The base body is therefore asymmetric with respect to a plane which runs in the longitudinal direction and is at right angles to the lower surface, with the contact-lug-side longitudinal section having a larger volume than the contact-lug-averted longitudinal section. This advantageously reduces the electrical internal resistance of the battery.

In one preferred embodiment, the battery cell connecting element is connected to a plurality of pole plates, which each have a cast lug with a cast lug width, wherein a groove width is less than half the accommodation width. This ensures a secure mechanical connection between the contact-lug-side pole plate at the edge and the battery cell connecting element. It is also advantageous for the groove width to be greater than one tenth of the cast lug width.

Figure 2:
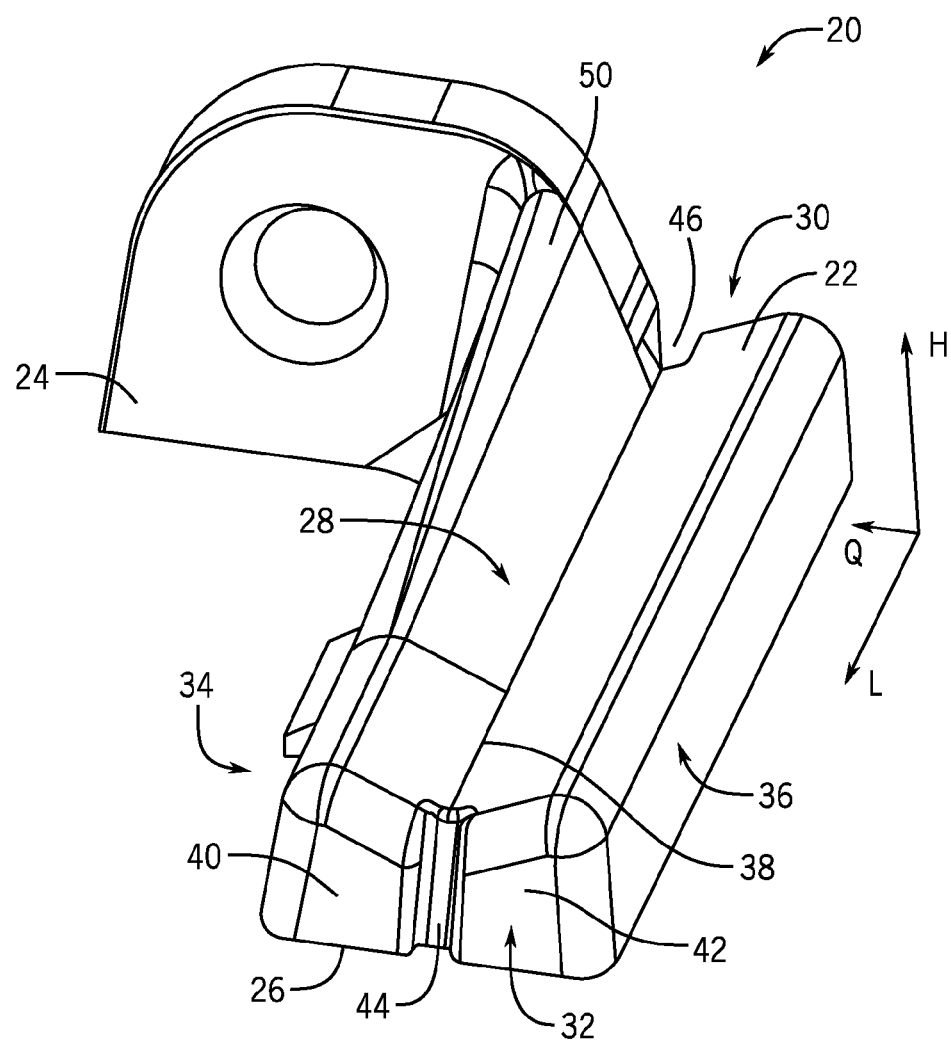
Figure 3A:
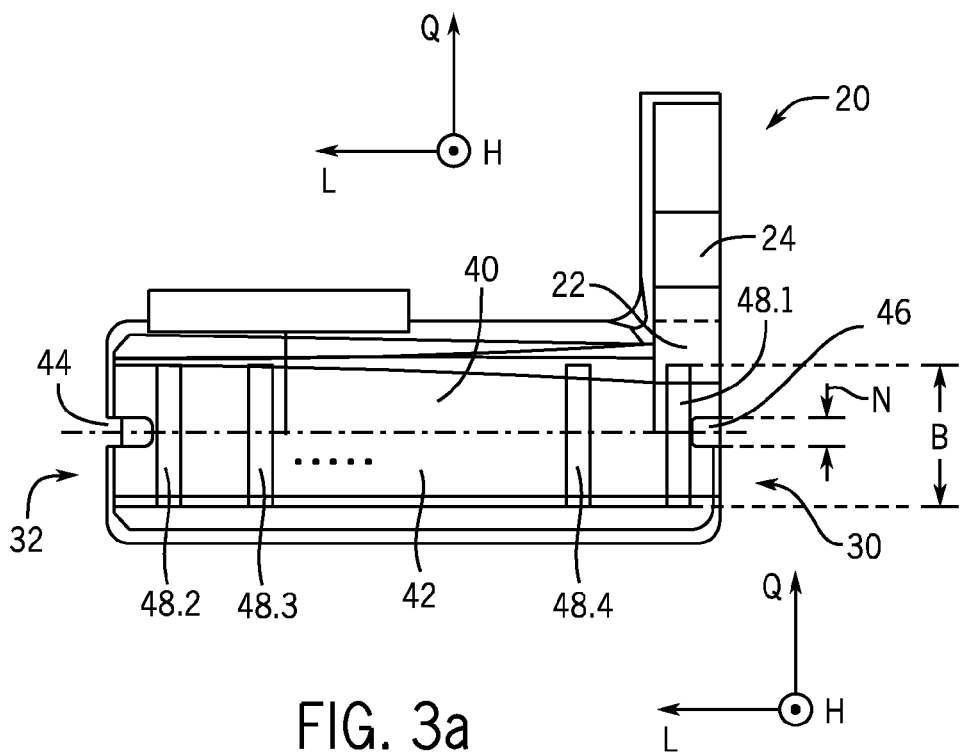
Figure 3B:
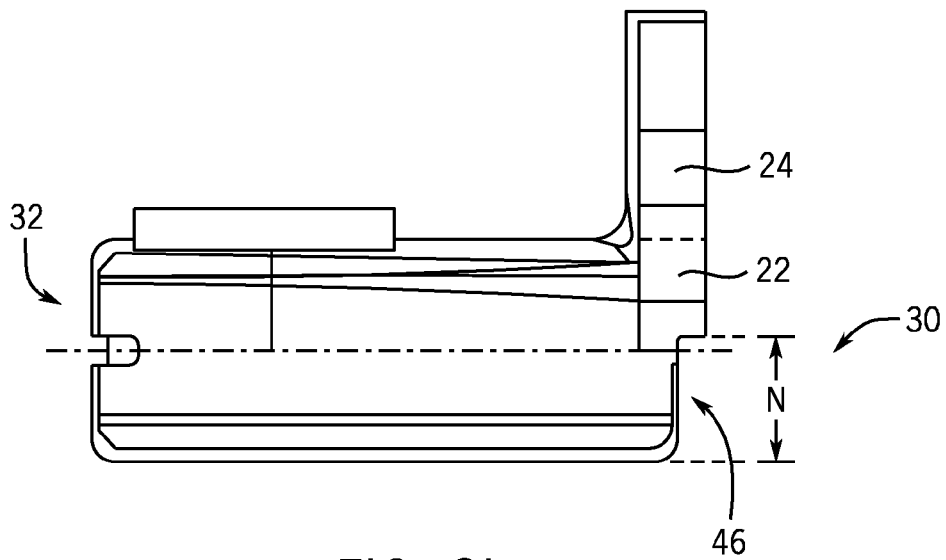

One embodiment of the invention will be explained in more detail in the following text with reference to the attached drawings, in which:

FIG. 1 shows a plan view of a battery according to the invention,

FIG. 2 shows a perspective view of a battery cell connecting element according to the invention, from the battery shown in FIG. 1, FIG. 3a shows a plan view of the battery cell connecting element shown in FIG. 2, FIG. 3b shows an alternative embodiment of a battery cell connecting element according to the invention, FIG. 4 shows a view of a longitudinal face of the battery cell connecting element shown in FIGS. 2 and 3a, FIG. 5 shows a plan view of a contact-lug-averted end face of the battery cell connecting element, and FIG. 6 shows one embodiment of a battery cell connecting element according to the prior art.

FIG. 1 shows a plan view of a battery 10 in the form of a lead-acid rechargeable battery which is used as a motor vehicle starter battery. The battery 10 has electrochemical cells 12.1 to 12.6. The electrochemical cell 12.1 comprises a positive plate set 14.1 and a negative plate set 16.1. In the same way, the other electrochemical cells 12.2 to 12.6 have corresponding respective positive and negative plate sets 14.2 to 14.6 and 16.2 to 16.6. The electrochemical cells 12.1 to 12.6 are physically and electrically isolated from one another by partition walls 18.1 to 18.5, and are arranged in an injection-molded housing.

Each of the plate sets 14.1 to 14.6 and 16.1 to 16.6 comprises a plurality of pole plates, which are mechanically and electrically connected to a battery cell connecting element 20.1 to 20.10, or to a connector 21.1 or 21.2. Two battery cell connecting elements in each case, for example 20.1 and 20.2 or 20.3 and 20.4, are electrically and mechanically connected to one another through an opening, which is not shown, in the respective partition wall 18.1 or 18.2, thus resulting in the electrochemical cells 12.1 to 12.3 being connected in series. In the following text, reference symbols without a numerical suffix denote the object per se.

FIG. 2 shows the battery cell connecting element 20, which comprises an essentially prismatic base body 22, which extends along a longitudinal axis L, and a contact lug 24 which extends on a lateral axis Q, which runs at right angles to the longitudinal axis L and to the vertical axis H. When the battery is in the installed position, the vertical axis H of the battery cell connecting element 20 runs vertically. The contact lug 24 and the base body 22 are integral components of the battery cell connecting element 20, which is produced by casting.

The battery cell connecting element 20 has a basic shape in the form of a right-angled prism with a lower face 26, an upper face 28, a contact-lug-side end face 30, a contact-lug-averted end face 32, a contact-lug-side longitudinal face 34 and a contact-lug-averted longitudinal face 36. A groove 38 runs along the longitudinal axis L, essentially at half the distance between the longitudinal faces 34 and 36 and subdivides the base body 22 into a contact-lug-side longitudinal section 40 and a contact-lug-averted longitudinal section 42.

A first groove 44 is formed in the contact-lug-averted end face 32 and passes through the entire contact-lug-averted end face 32, that is to say it runs from the lower face 26 to the upper face 28 of the battery cell connecting element 20. A second groove 46 is formed in the contact-lug-side end face 30, symmetrically with respect to a plane which runs at right angles to the longitudinal axis L and parallel to the lateral axis Q, which second groove 46 likewise runs from the lower face 26 to the upper face 28 and is therefore formed over the entire height in the contact lug 24. The first groove 44 and the second groove 46 run along the vertical axis H and are inclined through 10° to 20°, for example through 15°, in the direction of the longitudinal axis L, that is to say inward. This results in the cast lugs, which are not shown, of the pole plates, which are likewise not shown, being included better. Second groove 46 is arranged as a preventing element which prevents pole plates from the plurality of pole plates that are arranged adjacent to the contact lug (24) from being knocked out. Furthermore, the two grooves 44, 46 are connected by the groove 38. There is no need for the grooves 44, 46 to be bounded at the side by the contact-lug-averted longitudinal section 42. In fact, it is sufficient for the grooves 44, 46 to be bounded only by the contact-lug-side longitudinal section 40, thus forming a projection.

FIG. 3a shows a plan view of the battery cell connecting element 20 on a plane at right angles to the vertical axis H. Cast lugs 48.1, 48.2 of pole plates of a respective plate set 14 or 16 are illustrated schematically. As can be seen, the two cast lugs 48.1, 48.2 are respectively arranged adjacent to a second groove 46 or a first groove 44. Further cast lugs 48.3, 48.4 represent a multiplicity of cast lugs, which are arranged at equal intervals, on the pole plates of the respective plate set. The cast lugs 48.1, . . . , 48.4 have a cast lug width B which, in the present case, is seven times as broad as the groove width N of the second groove 46.

FIG. 3b shows an alternative embodiment of a battery cell connecting element 20 according to the invention, in which the second groove 46 passes through the entire contact-lug-averted longitudinal section 42 on its end face, and opens into the contact-lug-averted longitudinal face 36. In this case, the groove width N is half the width of the base body 22. As in the other figures as well, the base body 22 always extends from the contact-lug-averted end face 32 to the contact-lug-side end face 30.

FIG. 4 shows a side view in the direction of the lateral axis Q, showing a shoulder 50 of the contact-lug-side longitudinal section 40 (cf. FIG. 2).

As FIG. 5 shows, the shoulder 50 represents a reinforced material area, as a result of which the contact-lug-side longitudinal section 40 has a larger cross section in the vicinity of the contact-lug-side end face 30 (cf. FIG. 2) than the contact-lug-averted longitudinal section 42.

FIG. 6 shows an embodiment according to the prior art, which is known as a tombstone connector.

LIST OF REFERENCE SYMBOLS

10 Battery
12 Electrochemical cell
14 Positive plate set
16 Negative plate set
18 Partition wall
20 Battery cell connecting element
21 Connector
22 Base body
24 Contact lug
26 Lower face 28 Upper face
30 Contact-lug-side end face
32 Contact-lug-averted end face
34 Contact-lug-side longitudinal face
36 Contact-lug-averted longitudinal face
38 Groove
40 Contact-lug-side longitudinal section
42 Contact-lug-averted longitudinal section
44 First groove
46 Second groove
48 Cast lug
50 Shoulder
L Longitudinal axis
H Vertical axis
Q Lateral axis
B Cast lug width
N Groove width

The invention claimed is:

1. A battery having at least one battery cell connecting element (20) comprising:
    (a) an essentially prismatic base body (22), which extends along a longitudinal axis (L), for connection to a plurality of pole plates (14, 16) on a lower face (26) of the base body (22), and
    (b) a contact lug (24), which is arranged adjacent to a contact-lug-side end face (30) of the base body (22) and is integrally connected to the contact-lug-side end face (30) of the base body (22),
    (c) a groove (46) which is formed in the contact-lug-side end face (30) of the base body (22) and runs into the lower face (26),
    (d) wherein the groove (46) is arranged as a preventing element which prevents pole plates from the plurality of pole plates that are arranged adjacent to the contact lug (24) from being knocked out.

2. The battery as claimed in claim 1, characterized in that the groove (46) runs essentially at a right angle to the lower face (26).

3. The battery as claimed in claim 1, characterized in that the groove (46) runs inclined with respect to the lower face (26) through 10° to 20° in the direction of the longitudinal axis (L).

4. The battery as claimed in claim 3, characterized in that the groove (46) runs inclined with respect to the lower face through 15° in the direction of the longitudinal axis (L).

5. The battery as claimed in claim 1, characterized in that the groove (46) runs into the lower face (26) essentially centrally with respect to a lateral axis (Q) which runs at a right angle to the longitudinal axis (L).

6. The battery as claimed in claim 1, wherein the base body (22) includes an upper face (28) opposite the lower face (26) and having a height of the base body (22) provided there between, and characterized in that the groove (46) is formed over the entire height of the base body (22).

7. The battery as claimed in claim 1, characterized in that the base body (22) has a concave upper face (28), opposite the lower face (26), which comprises a groove (38) in the concave upper face (28) which extends along the longitudinal axis (L) and runs into the groove (46) in the contact-lug-side end face (30).

8. The battery as claimed in claim 7, characterized in that the groove (38) in the concave upper face (28) runs essentially at a right angle to the contact lug (24) and subdivides the base body (22) into a contact-lug-side longitudinal section (40) and a contact-lug-averted longitudinal section (42), with the contact-lug-side longitudinal section (40) running into the contact lug (24) in a shoulder (50).

9. The battery as claimed in claim 1, characterized in that the base body (22) is in the form of a right-angled prism.

10. The battery as claimed in claim 1, characterized in that the battery cell connecting element is connected to the plurality of pole plates (14, 16), which each have a cast lug (48) with a cast lug width (B), wherein a groove width (N) is less than half the cast lug width (B).

11. The battery as claimed in claim 1, characterized in that the battery is a lead-acid rechargeable battery.

12. A method for production of a battery cell connecting element (20) for a battery comprising the steps of:
    (a) provision of a plurality of pole plates (14, 16) and
    (b) casting of the pole plates with the battery cell connecting element (20), such that the battery cell connecting element (20) has
        (i) an essentially prismatic base body (22), which extends along a longitudinal axis (L), for connection to the plurality of pole plates on a lower face (26) of the base body (22),
        (ii) a contact lug (24), which is arranged adjacent to a contact-lug-side end face (30) of the base body (22) and is integrally connected to the contact-lug-side end face (30) of the base body (22), and
        (iii) a groove (46) which is formed in the contact-lug-side end face (30) of the base body (22) and runs into the lower face (26).

13. The method as claimed in claim 12, characterized in that the battery is a lead-acid rechargeable battery.

* * * * *